(12) United States Patent
Magaldi et al.

(10) Patent No.: US 10,647,513 B2
(45) Date of Patent: May 12, 2020

(54) BELT TRANSPORTATION SYSTEM

(71) Applicant: Magaldi Power S.P.A., Salerno (IT)

(72) Inventors: Mario Magaldi, Salerno (IT); Domenico Casillo, Buccino (IT)

(73) Assignee: Magaldi Power S.P.A., Salerno (IT)

( * ) Notice: Subject to any disclaimer, the term of this patent is extended or adjusted under 35 U.S.C. 154(b) by 0 days.

(21) Appl. No.: 15/745,316

(22) PCT Filed: Jul. 5, 2016

(86) PCT No.: PCT/IB2016/054018
§ 371 (c)(1),
(2) Date: Jun. 18, 2018

(87) PCT Pub. No.: WO2017/013517
PCT Pub. Date: Jan. 26, 2017

(65) Prior Publication Data
US 2018/0319597 A1    Nov. 8, 2018

(30) Foreign Application Priority Data

Jul. 17, 2015 (IT) .......................... 102015000035479

(51) Int. Cl.
*B65G 17/10* (2006.01)
*B65G 21/20* (2006.01)
(Continued)

(52) U.S. Cl.
CPC ......... *B65G 17/10* (2013.01); *B65G 21/2054* (2013.01); *B65G 39/12* (2013.01); *F23J 1/02* (2013.01); *B65G 2201/045* (2013.01)

(58) Field of Classification Search
CPC ...... B65G 17/06; B65G 17/067; B65G 17/08; B65G 17/10
(Continued)

(56) References Cited

U.S. PATENT DOCUMENTS 483,475   A    9/1892   Pollock
1,354,553 A *  10/1920  Harter .................. B65G 17/08
                                                   198/690.2
(Continued)

FOREIGN PATENT DOCUMENTS

FR       2212278 A1    7/1974
WO    2000010896 A1    3/2000
(Continued)

*Primary Examiner* — William R Harp
(74) *Attorney, Agent, or Firm* — Hunton Andrews Kurth LLP (57) ABSTRACT

A conveyor belt (10) of closed-path type comprising a plurality of transport plates (50), defining a transport surface for the material in a forward run of the conveyor belt itself, which plates are arranged in sequence along a longitudinal transport direction (L), wherein each plate bears a first (55) and a second (56) longitudinal end portion thereat, in said forward run, it is respectively superimposed on an adjacent plate arranged upstream of the sequence with respect to the longitudinal transport direction and placed under an adjacent plate arranged downstream in such sequence, or vice versa; and an annular structure (51) for connecting said plates being arranged, in said forward run, below said plates, wherein at least one of said plates, at said first or second longitudinal portion of superimposing or placing under an adjacent plate, has a cross section with thickness (s) decreased with respect to a remaining portion of the plate itself.

4 Claims, 11 Drawing Sheets

(51) Int. Cl.
*B65G 39/12* (2006.01)
*F23J 1/02* (2006.01)

(58) Field of Classification Search
USPC .................................................. 198/848–853
See application file for complete search history.

(56) References Cited

U.S. PATENT DOCUMENTS

| | | | |
|---|---|---|---|
| 2,080,828 A | | 5/1937 | Mastin |
| 3,877,568 A | | 4/1975 | Breiling et al. |
| 4,513,859 A | | 4/1985 | Long et al. |
| 4,887,539 A | * | 12/1989 | Magaldi ................. B65G 15/54 |
| | | | 110/165 R |
| 5,042,647 A | * | 8/1991 | Tyler .................... B65G 17/067 |
| | | | 198/822 |
| 5,255,615 A | * | 10/1993 | Magaldi ..................... F23J 1/02 |
| | | | 110/165 R |
| 7,146,915 B2 | * | 12/2006 | Magaldi ..................... F23J 1/02 |
| | | | 110/165 R |
| 7,958,991 B2 | * | 6/2011 | Magaldi ............... B65G 17/067 |
| | | | 198/850 |
| 8,371,794 B2 | * | 2/2013 | Magaldi ................... F23K 3/00 |
| | | | 414/291 |

FOREIGN PATENT DOCUMENTS

| | | | |
|---|---|---|---|
| WO | 2007034289 A1 | 5/2007 | |
| WO | 2008102387 A1 | 8/2008 | |

\* cited by examiner

BELT TRANSPORTATION SYSTEM

TECHNICAL FIELD OF THE INVENTION

The present invention relates to a dry transport device, in particular of metal belt type, suitable for handling high-temperature bulk materials, such as for example DRI (Direct Reduced Iron) outgoing from a reducing oven/reactor, ashes from fossil fuel outgoing from a combustion chamber or even slags produced by waste combustion.

The device is suitable for transporting high flow rates of material, even at high temperature and in presence of fines.

ANALYSIS OF PRIOR ART AND DRAWBACKS THEREOF

Devices for the dry transport of bulk materials, even at high temperature, for example bottom ashes outgoing from a combustion chamber, are known in the art. Such devices are based upon a so-called "metal belt" conveyor with configuration closed like a ring.

Figure 1A:
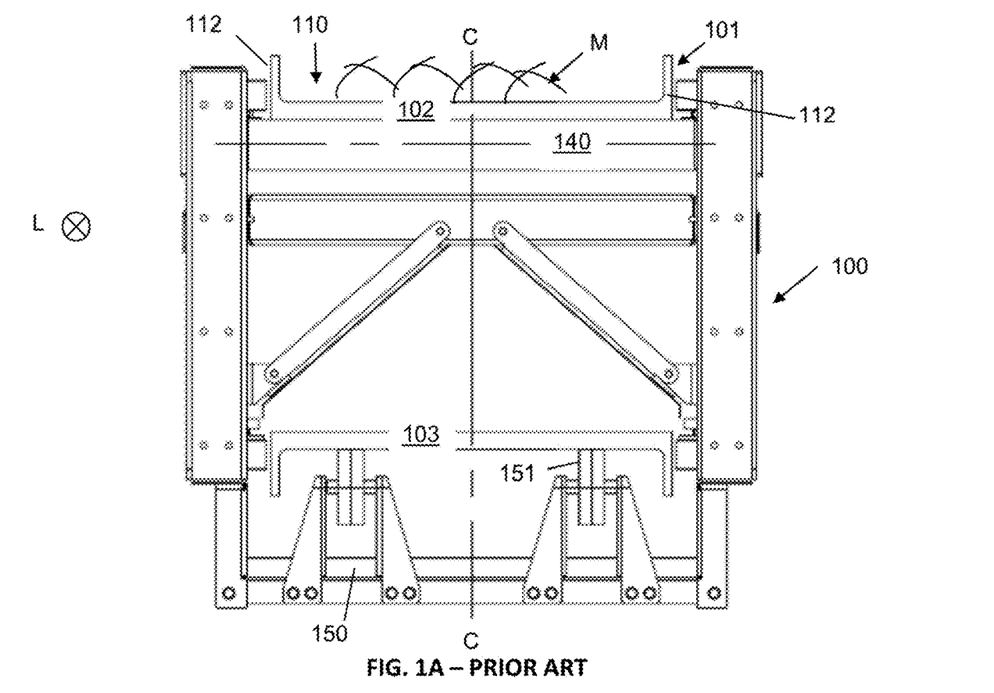

FIG. 1A shows a schematic representation, in cross section, of a transport device according to the known art, herein designated as a whole with 100. The device 100 comprises the above-said conveyor belt, designated with 101. The latter has a longitudinal transport surface 110 extending in a transport direction L orthogonal to the sheet.

Figure 1B:
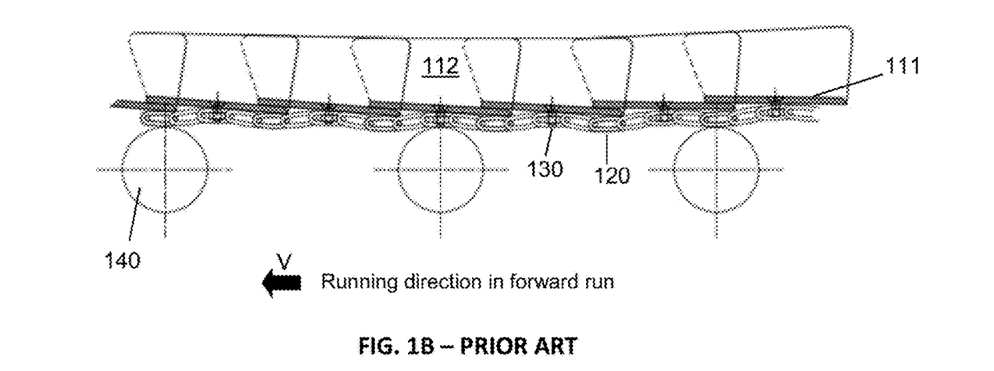

FIG. 1B shows a schematic representation in longitudinal section (performed according to the line C-C of FIG. 1A) of a tract of the conveyor belt 101. As shown in such figure, the transport surface 110 is delimited by a plurality of transport plates 111, typically made of metal and partially superimposed one onto the other one at respective end longitudinal portions. In particular, by considering the transport direction V along the direction L, each plate 111 is superimposed on the plate preceding it (that is downstream with respect to the direction V) and placed under the plate following it (that it upstream with respect to the direction V).

The plates 111 bear side borders 112 extending in longitudinal direction and with function of transversal containment of the transported material on the surface 110. Such material is generally designated with M in FIG. 1A.

The plates 111 are fastened to an underlying metallic net 120 configured like a ring by means of screws or rivets 130.

Figure 1C:
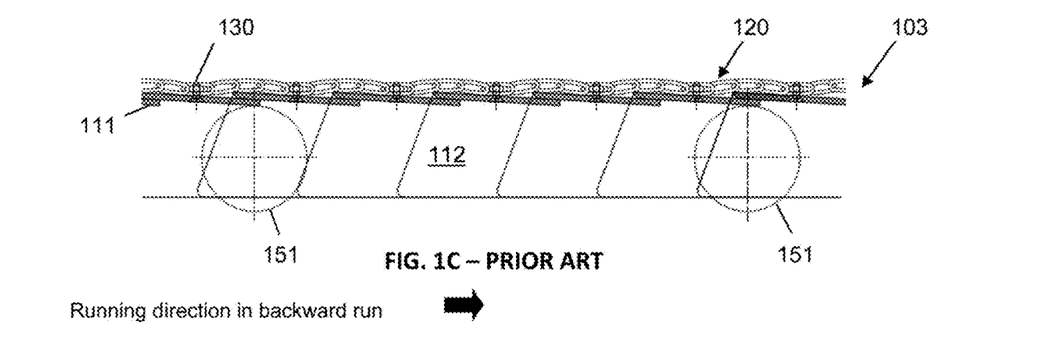

Thanks to such ring-like configuration, on the conveyor belt 101, upon use, an upper forward run 102 defining the above-mentioned transport surface 110 and a lower backward run 103 can be detected. The latter is shown in greater detail in FIG. 1C, which represents a longitudinal section portion performed according to the line C-C of FIG. 1A. The development of the conveyor belt 101 in the two forward and backward runs 102 and 103 can be considered substantially planar.

In the forward run 102, the conveyor belt 101, and in particular the set of the plates 111 and the net 120, is supported on transversal rollers 140.

In the backward run 103—that is downstream of the discharge of the material M—the conveyor belt 101 is supported by means of a plurality of cross-beams 150, parallel to the width of the conveyor itself. Each cross-beam 150 bears two or more wheels 151, assembled on supports, whereupon the plates 111 are rested. The wheels 151 are free to rotate, by means of roller bearings, around a fixed axis integral to the supports. Both the wheels 151 and the rollers 140 rotate around cross axes parallel therebetween which, in the representation of FIG. 1A, are horizontal and parallel to the sheet.

Figure 2A:
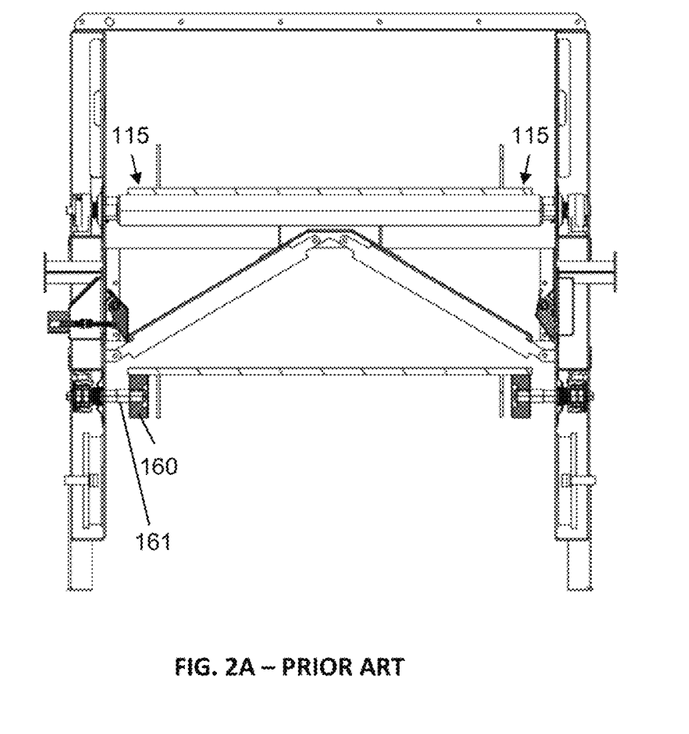
Figure 2B:
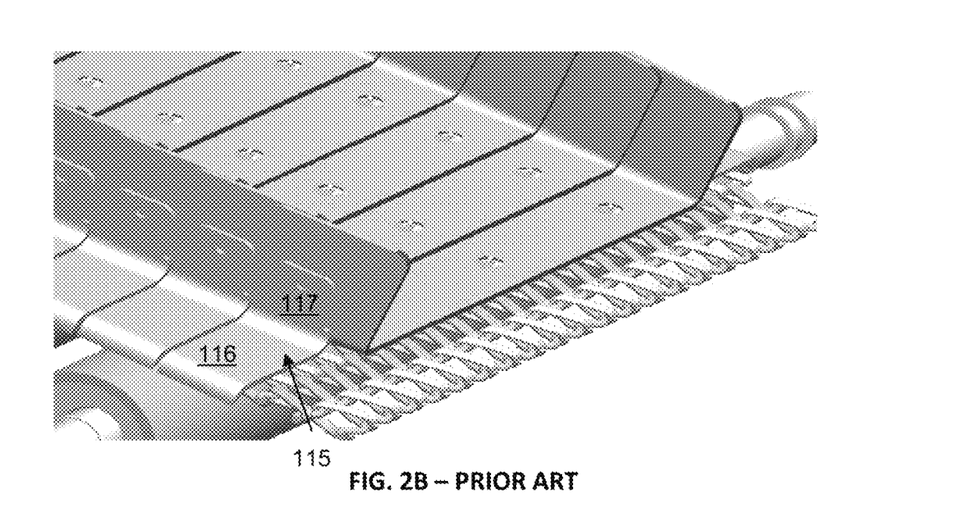

A different configuration, known too, of the herein considered transport device is shown in FIGS. 2A and 2B. In this case, the conveyor belt, on both sides, has prolongations or extensions 115 developing substantially in the same plane of the transport plates. Such side prolongations are implemented by means of "L"-like bent profiles. A side or branch 116 of the "L" lies indeed in the plane of the transport surface, whereas the other branch 117 is welded to the outer side surface of each one of the transport plates, more precisely it is welded outwards on each one of the containment side borders 115.

In presence of such side extensions 115, the backward run of the conveyor belt is supported at the same extensions by means of two rollers 160 assembled in cantilevered way on respective small shafts or cross axes 161. The latter are free to rotate with respect to the container of the transport device thanks to the interposition of roller bearings around cross axes parallel to the sheet in FIG. 2A.

This second known configuration avoids an interference of the supporting system of the backward run of the conveyor belt with possible (not represented) cleaning *pendula* of the container bottom.

Figure 3:
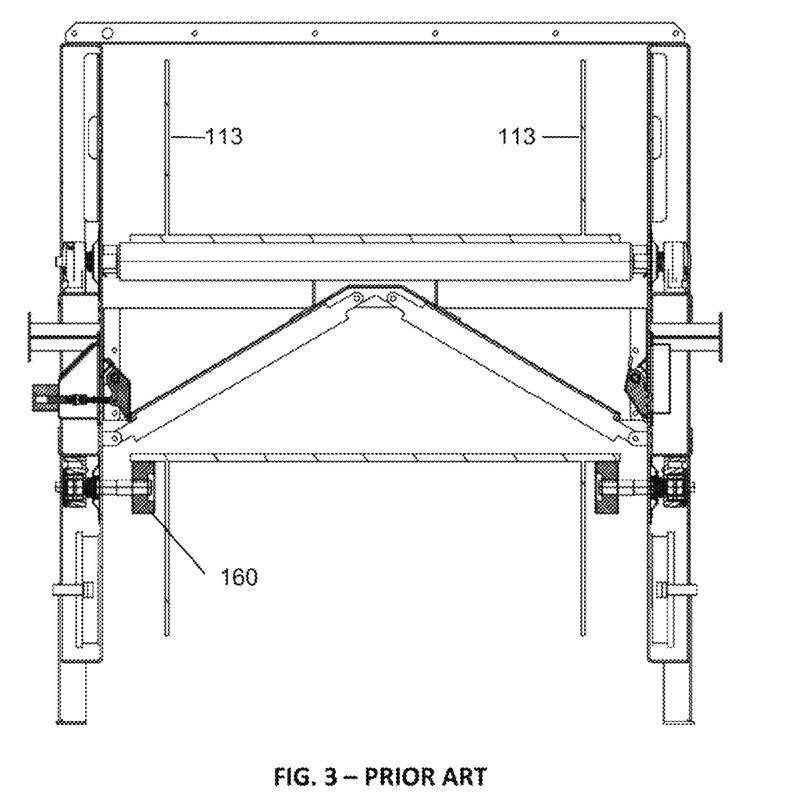
Figure 4:
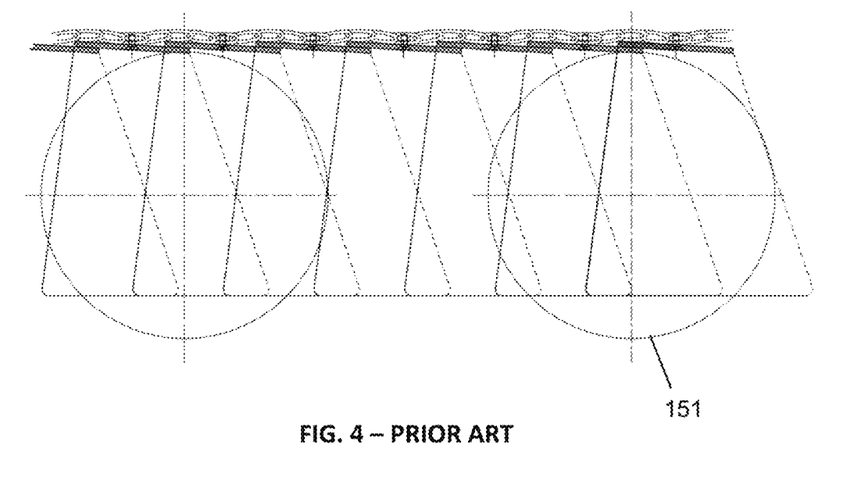

FIGS. 3 and 4 show a view respectively in cross and longitudinal section of respective variants of the conveyor belt of FIGS. 2A and 2B. In this case the belt comprises side borders, herein designated with 113, having high height. Such increased height of the borders allows increasing the volumetric flow rate of transportable material.

In FIG. 3 it is to be noted that such side borders can have elevation even equal to about half width of the transport surface. In the example of such figure, the system for supporting the backward run of the conveyor belt is of the type with cantilevered rollers 160 and analogous to that of FIG. 2A.

In the configuration of FIG. 4, the system for supporting the backward run of the conveyor belt is of the type with wheels 151 assembled on cross-beams, similarly to that of FIG. 1A. It is appreciated that the supporting wheels have high diameter, greater than the height of the side borders.

Figure 1D:
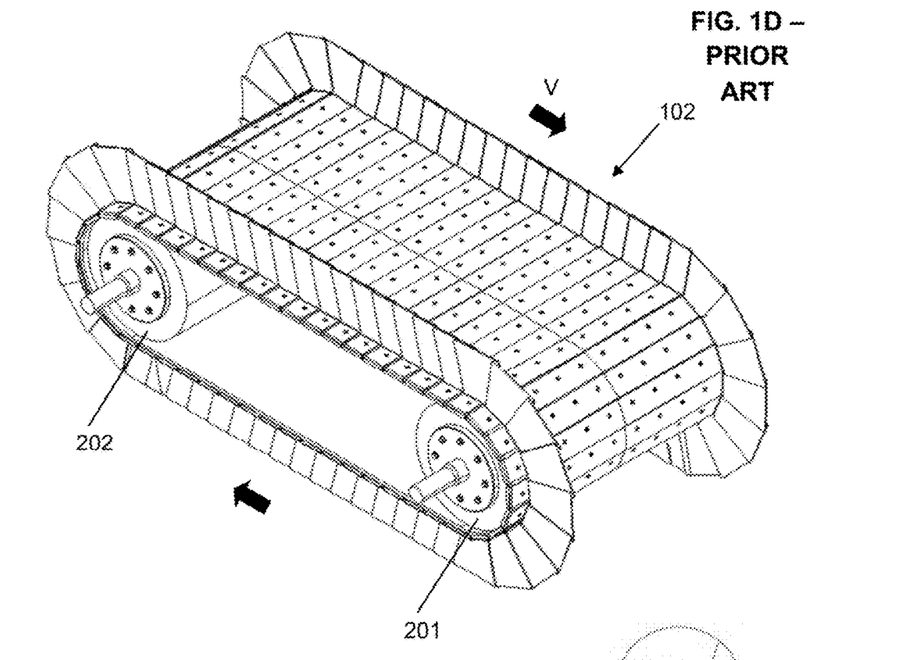
Figure 1E:
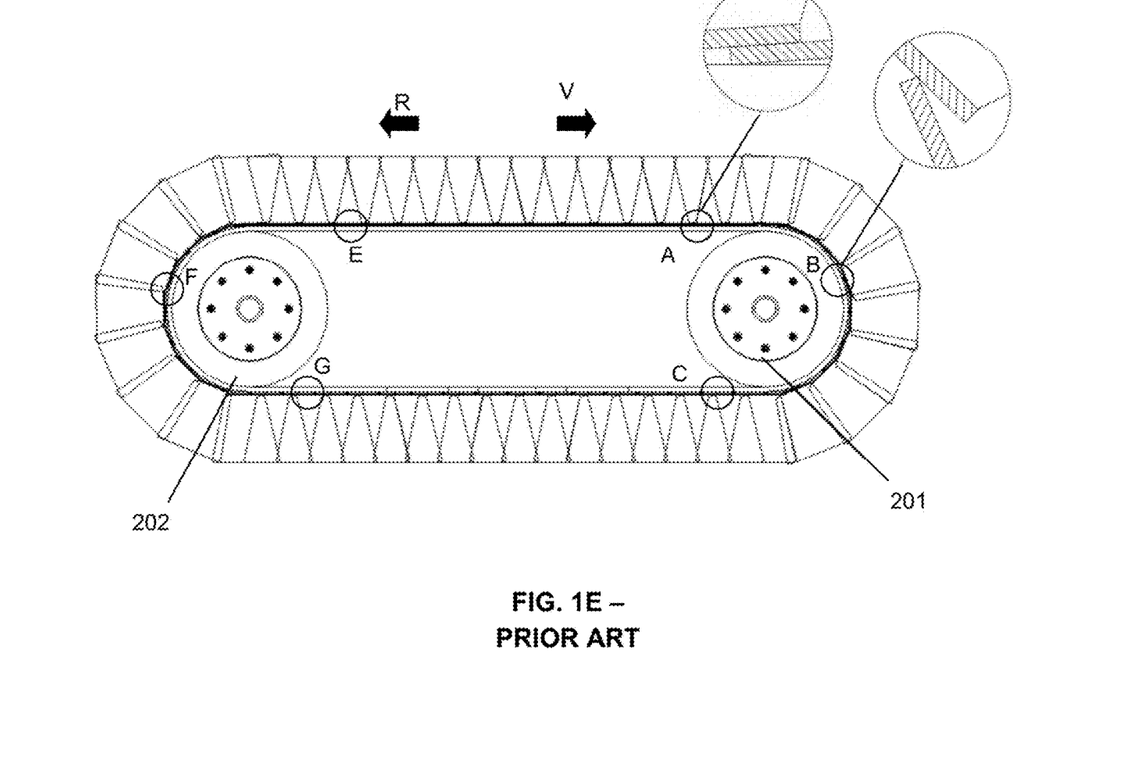

In all above-described configurations, the above-mentioned two main forward and backward runs 102 and 103 of the conveyor belt 101 are connected by two curved runs, shown in FIGS. 1D and 1E. The latter figures represent simplified respectively perspective and side views of the conveyor 101. As it is appreciated even from such figures, the metallic net 120 acts as member for transmitting the motion for the conveyor 101, by connecting two drums with adequate diameter arranged at the longitudinal ends of the conveyor itself, in particular a driving drum 201 and a driven, or idler, drum 202. The driving drum 201 is moved by means of an electric motor connected to the shaft thereof, the other drum 202 is idle and induced to rotate around its own axis thanks to the contact by friction with the metallic net, the latter put in tension by a suitable tensioning system connected to the drum 202 itself. The drums 201 and 202 are revolving around cross axes, arranged horizontal and orthogonal to the sheet in FIG. 1E.

Figure 1F:
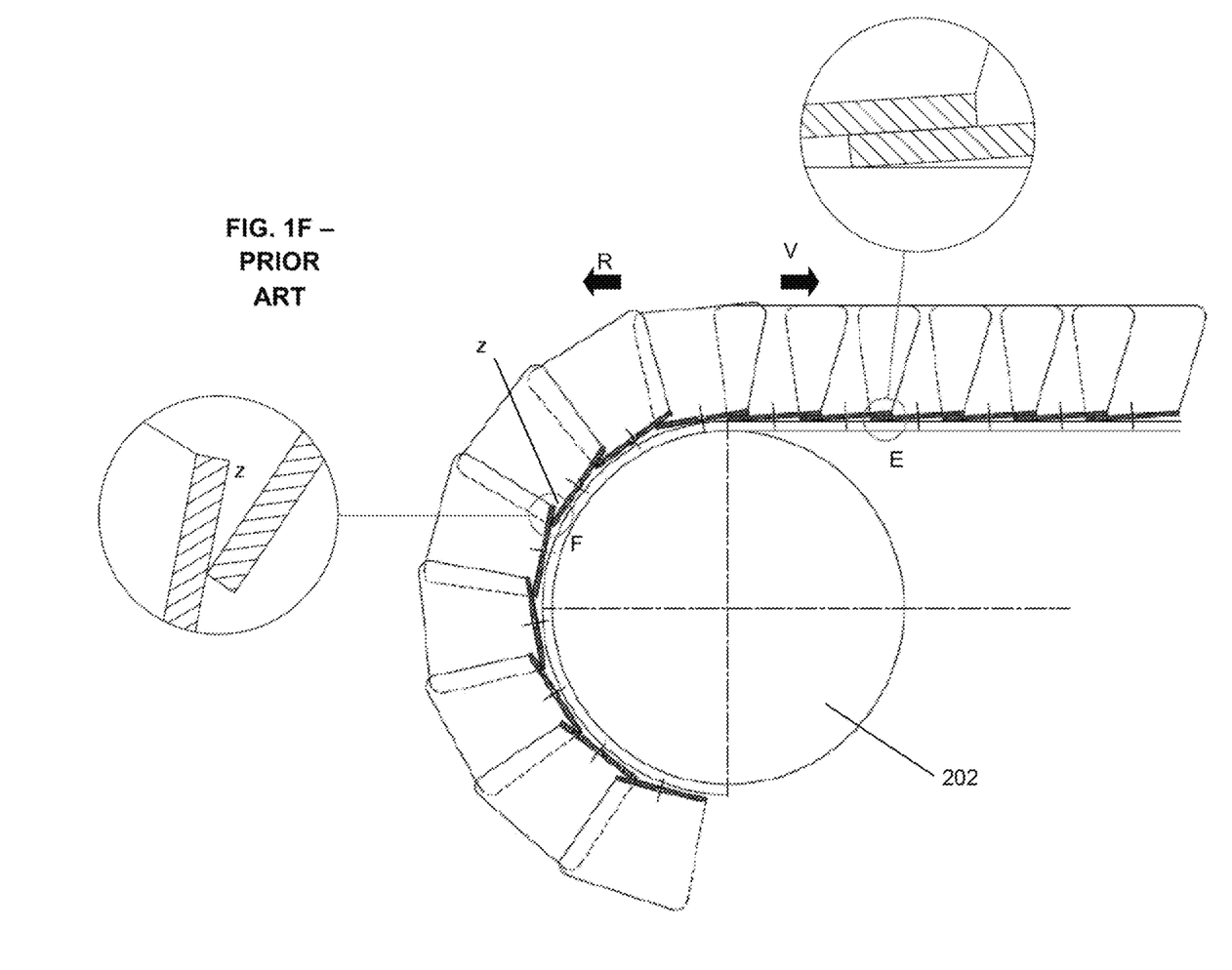

FIG. 1F shows, in side view, a detail of the winding of the transport belt on one of the drums of FIGS. 1D and 1E. In the specific case, by considering the transport direction V, it is the driven drum 202.

Upon the rotation of the belt around the drums, the opening of two subsequent plates occurs, to a variable extent depending upon the size of the plates themselves and the superimposition thereof, as well as the diameter of the single drums. In particular, in FIG. 1F an opening z variation between two subsequent plates is highlighted, that is a mutual spreading, when these are in the transport run 102 and in the winding on the idle drum 202. At the end of the winding on the drums, the plates close again and the generated opening is annulled.

By going deeper in details, the two sets of three points A, B and C and E, F and G of FIG. 1E, related to the half-circumferences described by the transport belt in the winding on the two drums 201 and 202, are considered parallelly.

With running direction of the traditional belt in the direction V (direction of superimposing of the plates), the mutual arrangement of the plates allows the regular transport and discharge of the material. At point A, before the winding on the driving drum 201, the plates are tightened mutually and to the traction net thanks to the fastening system and to the tension applied thereto. At point B, during the winding of the belt on the drum 201, the opening determined between two subsequent plates does not interfere with the falling direction of the material which abandons the plates by gravity. At point C, after the material discharging phase, the plates close again, by annulling the opening which has previously created.

In case of running reversal of the conveyor, that is with direction denoted by R, the opening z determined between the plates at the winding on the drum 202, at the point F, is the place inviting to enter even fine transported material between the plates and between them and the supporting net. At the end of the rotation on the drum 202, the plates tend to approach by annulling the created opening z up to close again at point G.

The above-described known belt conveyors have a not yet optimized configuration with respect to the transport needs appearing in different applications, as it will be illustrated in greater detail hereinafter.

One of the fundamental planning parameters of the belt conveyors of the above illustrated type is the volume flow rate of transportable material, correlated to the speed of the conveyor belt. Furthermore, in case of high temperature material the quantity of thermal energy contained in the material itself is dissipated in lower extent upon increasing the transport speed. The fact of keeping the thermal content of the transported material allows huge energy savings in the downstream processes, for example as it happens in the supply of the blast furnace with metal swarf or coke.

The maximization of said volume flow rate—and then of the related thermal content—the overall sizes being equal, represents a fundamental need which the current solutions do not satisfy in optimum way.

In particular, such flow rate is mainly determined by:
the cross section available for the transport, depending upon the width of the plates and the height of the containment side borders; and
the transport speed, that is longitudinal motion of the conveyor belt.

Therefore, once fixed the width of the transport belt, the volume flow rate of transported material increases if the belt speed and/or the height of the side borders is increased.

As regarding the possibility of increasing the height of the containment side borders of the conveyor, an important limit is associated to the system for sustaining the backward run.

In case of sustaining with cross-beams and wheels, upon increasing the height of the side borders it results that the backward wheels cannot be easily subjected to inspection/maintenance, while this procedure is absolutely required for the ordinary maintenance of the conveyor and more frequent in case of transport of high temperature material which subjects the belt to thermal stress. In particular, as already noted by referring to FIG. 4, upon increasing the height of the side borders, the diameter of the backward wheels has to increase too, with a consequent increase in the total overall height size of the conveyor. Moreover, even with such increase in diameter it is however difficult to perform the maintenance of the backward wheels due to the position thereof inside the transport section.

In case of sustaining the backward run of the belt obtained with cantilevered rollers, as shown for example in FIG. 3, upon increasing the height of the side borders—especially if in association to an increase even in the width of the belt and in the thickness of the plates—the conveyor weight increases. Consequently, the side prolongations of the transport surface are subjected to considerable cut efforts, above all in the welding point connecting them to the plates. Furthermore, such cyclic effort can trigger fatigue failures wherein the failure even of only one of such prolongations can cause a domino effect on the subsequent prolongations and a consequent conveyor stop. This limits the possibility of implementing belt conveyors of this type with high transport sections and high thicknesses of the plates.

In relation to the need of increasing the flow rate the other parameters being equal, the Inventors have detected that the maximization of the belt speed is hindered mainly by two aspects of the known configurations.

By referring again to FIG. 1C, a first aspect is linked to the superimposition of adjacent plates of the conveyor. In fact, due to such superimposition the surface of the conveyor in contact with the rollers for sustaining the backward run is not flat and regular, on the contrary it has steps with height equal to the thickness of the plates in the superimposition points thereof.

Upon the passage of the conveyor on the backward wheels, at such steps local liftings of the belt are determined which, when operating, determine the creation of vibrating phenomena which can be potentially propagated to the whole transport device. Such vibrations can lead to phenomena of resonance and then mechanical instability. As a consequence of this, the known conveyors of the considered type do not allow speeds higher than 0.10-0.15 m/s and, in reality, they are not applied for flow rates of material higher than 200-300 m$^3$/h.

The above-said vibrations can further produce a high noise of the transport system as a whole.

Still, potentially the above-mentioned steps can determine a damage of the supporting wheels and/or jam mings.

It is to be noted that the illustrated phenomenon gets worse upon increasing the thickness of the plates of the conveyor, the latter, instead, being proportional to the mechanical resistance of the conveyor itself and then, at last, to the flow rates which can be handled.

Figure 5:
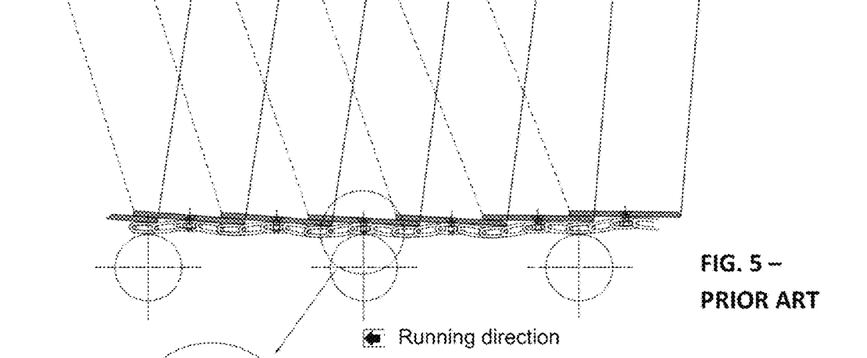
Figure 5A:
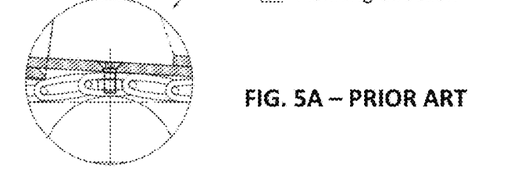

A second aspect limiting the speed increase of the conveyor belt is associated to the connection of the transport plates to the metallic net. FIGS. 5 and 5A relate to the conveyor configuration of FIG. 3 in order to exemplify the herein considered drawback thereof, but analogous observations are valid also for the other above-described known considerations. In particular, the already mentioned superimposition of adjacent plates make that the metallic net placed thereunder in the forward run of the conveyor follows the irregular, stepped course, determined by the superimposition itself. Consequently, in the forward run the conveyor moves forward with a sussultatory course, determined by small and repeated lifts of the belt upon passing the superimposition regions of the plates on each sustaining roller.

Even this phenomenon determines vibrations, which grow upon increasing the speed and the thickness of the bearing plates.

Even for this reason, the known conveyors do not allow speeds higher than 0.10-0.15 m/s. Furthermore, said vibrations cause an additional absorption of requested power.

Another significant limit of the known conveyor belts is the substantial impossibility of reversing the running direction of the belt itself, and this due to the spreading of the plates at the winding rollers highlighted by referring to FIGS. 1D, 1E and 1F.

In particular, as illustrated above the configuration of the known conveyor belts is suitable for the material transport only in the nominal running direction, corresponding to the superimposition direction of the plates (upstream plate placed under the downstream plate in the transport run).

The above-mentioned spreading of the plates further creates problems even in case of tilted transport, regardless the reversibility or not of the belt running direction. In fact, even in this situation the transported material, in one of the winding runs on the rollers, tends to insert between the plates and between them and the underlying net, in particular when the tilting exceeds the dynamic friction angle of the material.

In case of material penetration in the opening z between the plates—due to the belt running direction and/or tilting—the material itself remains trapped between adjoining plates, by inducing improper mechanical efforts above all in the point connecting plate and metallic net and/or by causing the loss in sealing between the plates characteristic of the metal conveyors of the described type. Therefore, under various operating conditions, if the extraneous material remains trapped between the plates the belt conveyor loses its functionality and reliability.

Furthermore, if the introduced material is uncompressible (for example metal swarf) it can get jammed with fixed portions of the conveyor, by determining sudden running stops or being released not in the provided discharging point, but in an unwished way in any point of the backward run.

SUMMARY OF THE INVENTION

The technical problem placed and solved by the present invention is then to provide a belt transport system allowing to obviate one or more of the drawbacks mentioned above with reference to the known art.

Such problem is solved by a conveyor belt suitable for the dry transportation of bulk material even at high temperature, such as for example DRI (Direct Reduced Iron) outgoing from reducing oven/reactor, which conveyor is of closed-path type and it comprises:
  a plurality of transport plates, in particular made of metal, defining a transport surface for the material in a forward run of the conveyor belt itself,
  which plates are arranged in sequence along a longitudinal transport direction, wherein each plate bears a first and a second longitudinal end portion thereat, in said forward run, it is respectively superimposed on an adjacent plate arranged upstream of the sequence with respect to the longitudinal transport direction and placed under an adjacent plate arranged downstream in such sequence, or vice versa; and
  an annular structure for connecting said plates, in particular an element preferably net-like shaped and preferably made of metal, which annular structure is arranged, in said forward run, below said plates,
wherein at least one of said plates, at said first or second longitudinal portion of superimposing or placing under an adjacent plate, has a cross section with thickness (s) decreased with respect to a remaining portion of the plate itself.

Such problem is also solved by a transport device suitable for the dry transportation of high flow rates of bulk material, for example DRI (Direct Reduced Iron) outgoing from the reduction oven/reactor, which device comprises:
  a conveyor belt of closed-path type having, upon use, a transport run, or forward run, and a backward run, which conveyor belt, in said forward run, defines a transport region delimited on the lower side by a transport surface and laterally by containment borders of the transported material, which containment borders rise from said transport surface as far as their own end margin;
  supporting means of said conveyor belt in said backward run, which supporting means in turn comprises revolving supporting elements,
wherein the overall configuration is so that, upon use, said revolving supporting elements sustain said conveyor belt at said containment borders, the end margin of the latter sliding on said revolving supporting elements.

Preferred features of the present invention are subject of the depending claims.

The present invention provides a belt transport system, in particular with metal plates, effective and reliable even for high flow rates of transported material, especially bulk material with high temperature and/or in presence of fines.

In a first meaning, the invention provides a device comprising a conveyor belt equipped with containment side borders, the backward run thereof is supported at such borders instead of directly at the transport surface or extensions thereof.

In this way, the supporting elements result to have easy access, inspection and maintenance without increasing the overall sizes or weights. Furthermore, in case of conveyor with superimposed or so-called imbricate plates, vibrations linked to the contact of the supporting elements with the superimposed portions of the plates themselves are avoided.

Based upon a second meaning, the invention provides a conveyor belt based upon a longitudinal sequence of plates, partially superimposed the ones onto the other ones, wherein each plate—or a portion of the plates—has a portion with reduced thickness at the superimposition region with an adjacent plate. Preferably, each plate is tapered in the transport longitudinal direction at said superimposition portion, by thinning towards the longitudinal end thereof.

In this way, the step-like profiles reduce or become null in the contact between conveyor and supporting rollers in the forward run of the conveyor itself.

Based upon a preferred embodiment of such second meaning, each plate has a chamfer made at the end placed under an adjacent plate. Preferably, the chamfer angle is greater than or equal to the rotation angle covered by each plate on the drum, as better described hereinafter.

The proposed configuration allows eliminating the mechanical interference between the lower surface of the upper plate and the end edge of the plate placed under during the rotation of the first one on the drum. In this way, the effect of the spreading between the plates of the traditional metal belt conveyors, which does not allow the functionality thereof in the running direction opposite to the main direction and/or in case of use with strong tilting, is annulled.

The invention allows then to reverse the running direction and/or to arrange the tilted belt without penalizing the system reliability in treating abrasive heterogeneous materials, even at high temperature and/or accompanied by fines.

The transport system also results to be very versatile with respect to different applications, by widening the use possibilities with respect to the previously described traditional transport systems. The reversibility of the running direction of the transport belt even allows to reverse the running, by using the conveyor as flow deflector.

The conveyor of the invention can be suitable to move forward according to a direction in the two possible running directions and up to tilting of 100%.

The above-mentioned various meanings of the invention can be applied one independently from the other one or in combination, in the latter case by obtaining an important synergy which increases the reliability and the effectiveness of the transport system, as well as the flow rates which can be handled.

In particular, in preferred embodiments the invention allows an effective support of the belt and a fluid sliding thereof, in the forward run, in the backward run and around the idle rollers, by avoiding vibrations and without increases in the powers due to such vibrations nor in the overall sizes of the transport device.

Other advantages, features and use modes of the present invention will result evident from the following detailed description of some embodiments, shown by way of example and not for limitative purpose.

BRIEF DESCRIPTION OF THE DRAWINGS

The figures of the enclosed drawings will be referred to, wherein FIGS. 1A to 5A have been already mentioned above with reference to the known art and wherein, in particular:

FIGS. 1A to 5A have been already mentioned above with reference to the known art;

The sizes, and in particular the thicknesses and the angles, represented in the above-mentioned figures, are to be meant by pure way of example and they are not necessarily shown in proportion.

Detailed Description of Preferred Embodiments

Several embodiments and variants of the invention will be described hereinafter, and this by referring to the above-mentioned Figures.

Generally, analogous components are designated in the different figures with the same numeral reference.

In the following detailed description, additional embodiments and variants with respect to embodiments and variants already treated in the description itself will be illustrated limitedly to the differences with respect to what already illustrated.

Furthermore, the different embodiments and variants described hereinafter can be used in combination, when compatible.

Figure 6:
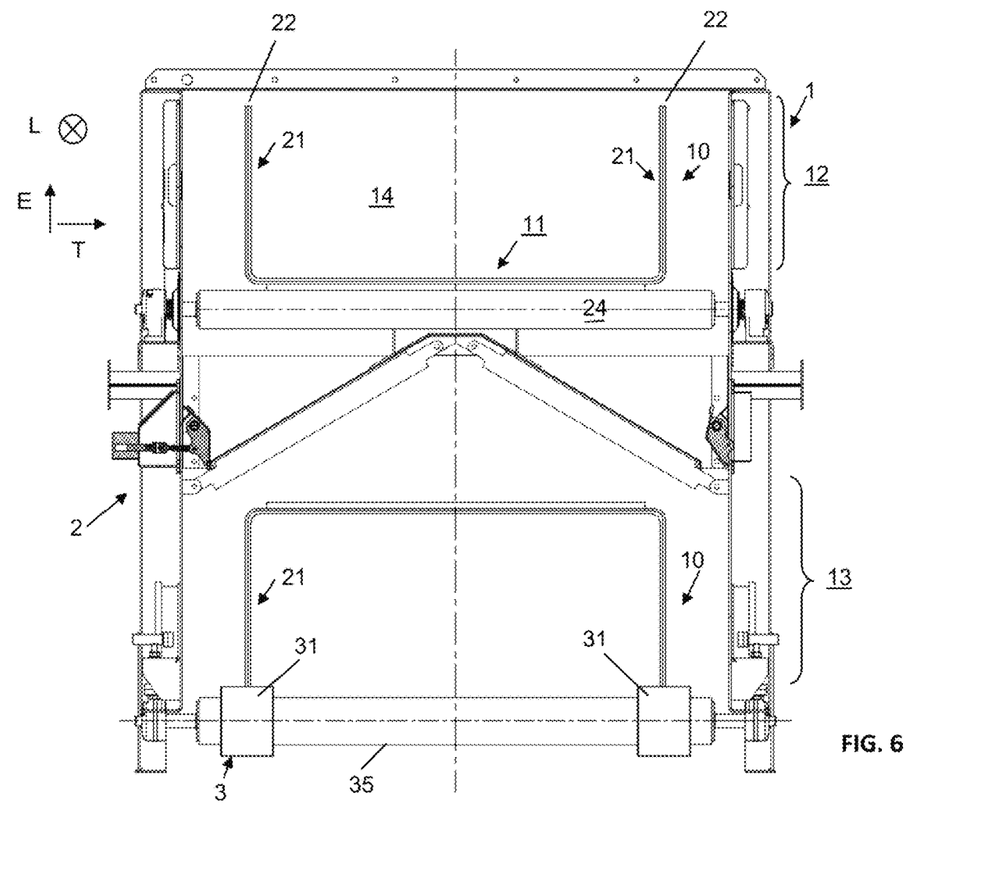
FIG. 6 relates to a first preferred embodiment of a transport device according to the invention, by showing a cross section view thereof.
Figure 6A:
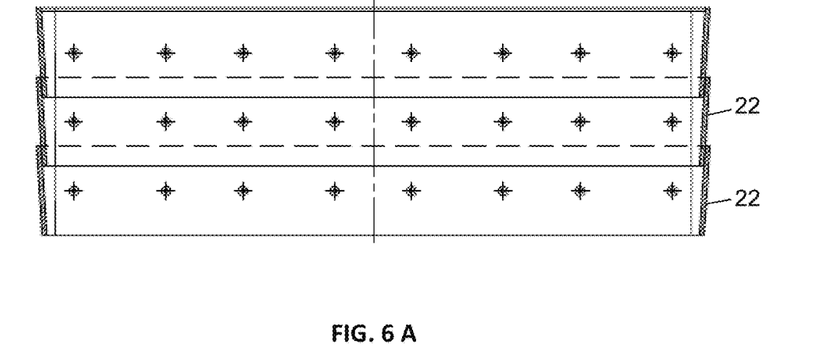
FIG. 6A shows a top plan view of a portion of a conveyor belt of the device of FIG. 6.

By referring to FIGS. 6 and 6A, a transport device according to a first preferred embodiment of the present invention is designated as a whole with 1.

The transport device 1 is suitable for the dry transport of high flow rates of bulk material or lump size material, such as for example DRI (Direct Reduced Iron) from a reducing oven or bottom ash outgoing from a combustion chamber. In a specific application, the device 1 is indeed of the type apt to be arranged below reducing ovens/reactors for the production of DRI or the boiler of a plant for producing energy from fossil fuel.

The device 1 mainly comprises:
a conveyor belt, designated as a whole with 10,
a container, casing or frame 2 within which the conveyor belt 10 is received, and
supporting means 3 of a backward run of the conveyor belt 10.

Each one of the above-mentioned components will be now described in greater detail.

The conveyor belt 10 is of closed-path type, that is annular, and, upon use, it has a forward run 12 and a backward run 13. For better clarify, FIG. 6 shows a transport direction, or longitudinal direction L, which is indeed the forwarding direction of the conveyor belt in the forward run and in the backward run, with opposite directions in the two runs. Two mutually orthogonal directions, and also perpendicular to the direction L, are further defined, that is a cross direction T corresponding to the width of the conveyor 10 and an elevation direction E. In the representation of FIG. 6, the direction L is orthogonal to the sheet and the two directions T and E lie on the sheet.

The development of the conveyor belt 10 in the two forward and backward runs 12 and 13 can be considered substantially planar according to the directions L and T.

The two main runs 12 and 13 are connected by two curved connecting runs at the winding around the driving and driven drums, similarly to what already illustrated with reference to the known art.

Upon use, at the forward run 12 a transport region 14 is defined, delimited on the lower side by a transport surface 11 extending in direction L and T and laterally by two containment borders, or bulkheads 21 of the transported material. The latter develop in elevation from the transport surface 11 along the direction E as far as its own end margin 22 and also extend in direction L.

The casing 2, preferably of sealing type, also houses the components responsible for the motion of the conveyor belt 10, in particular the above-mentioned one or more driving and driven drums. Since such components are of type known on itself one will not further dwell upon the description thereof.

The casing 2 further houses cross supporting rollers 24 of the conveyor 10 in the forward run 12 or elements equivalent thereto. In particular, such rollers 24 can be arranged with regular pitch along the longitudinal extension of the conveyor 10. Typically, the rollers 24 are free to rotate around their own axis by means of interposition of roller bearings, or equivalent means, assembled on the container 2.

In the backward run 13, the conveyor belt 10, downstream of the discharge of the transported material, is supported by means of the above-illustrated means 3. Such means, in the present example, comprises a plurality of continuous transversal rollers 35, free to rotate (idle) around their own axis by means of roller bearings arranged at the two ends and outside the section of the conveyor belt. Said rollers are parallel to the width of the conveyor itself, that is the direction T, and only one is visible in FIG. 6. Each roller 35 preferably supports two wear elements 31 whereupon the end margins 22 of the containment borders 21 are rested.

Figure 7:
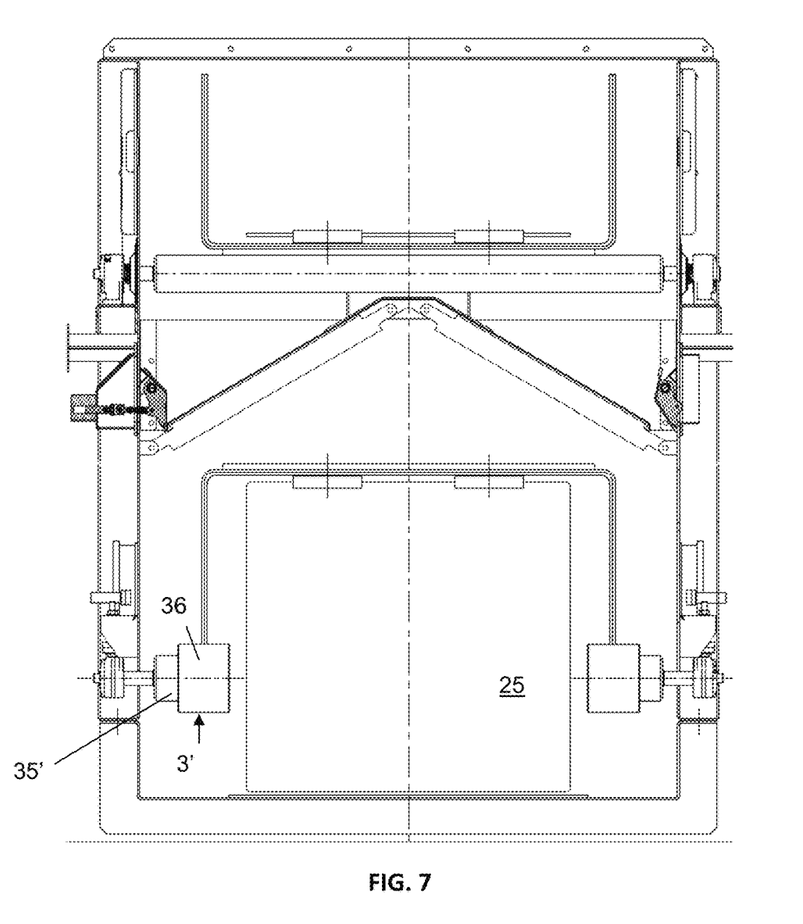
FIG. 7 relates to a second preferred embodiment of a transport device according to the invention, by showing a cross section view thereof.

Based upon a different embodiment shown in FIG. 7, the supporting means, herein designated with 3', provides the use of revolving (idle) elements, in particular rollers, 36 cantilevered assembled at the flanks of the container 2. In particular, roller bearings are provided assembled on the flanks of the container 2 and supporting indeed the revolving elements 36 and respective cross uprights, or hubs, 35'. Even in this case, upon the elements 36 the end margins 22 of the containment borders 21 are rested. In this way, interferences of the means for supporting the backward run of the conveyor belt with possible cleaning pendula or buckets 25 of the container bottom 2. Such configuration with pendula is described in WO 2009/138949, which is meant to be incorporated herein by means of this reference.

In other components thereof, the configuration of FIG. 7 is analogous to that of FIG. 6.

The structure of the conveyor belt 10, based upon a particularly preferred embodiment of the invention, is shown in greater detail in FIGS. 8A, 8B, 8C and 8D.

Figures 8A, 8B:
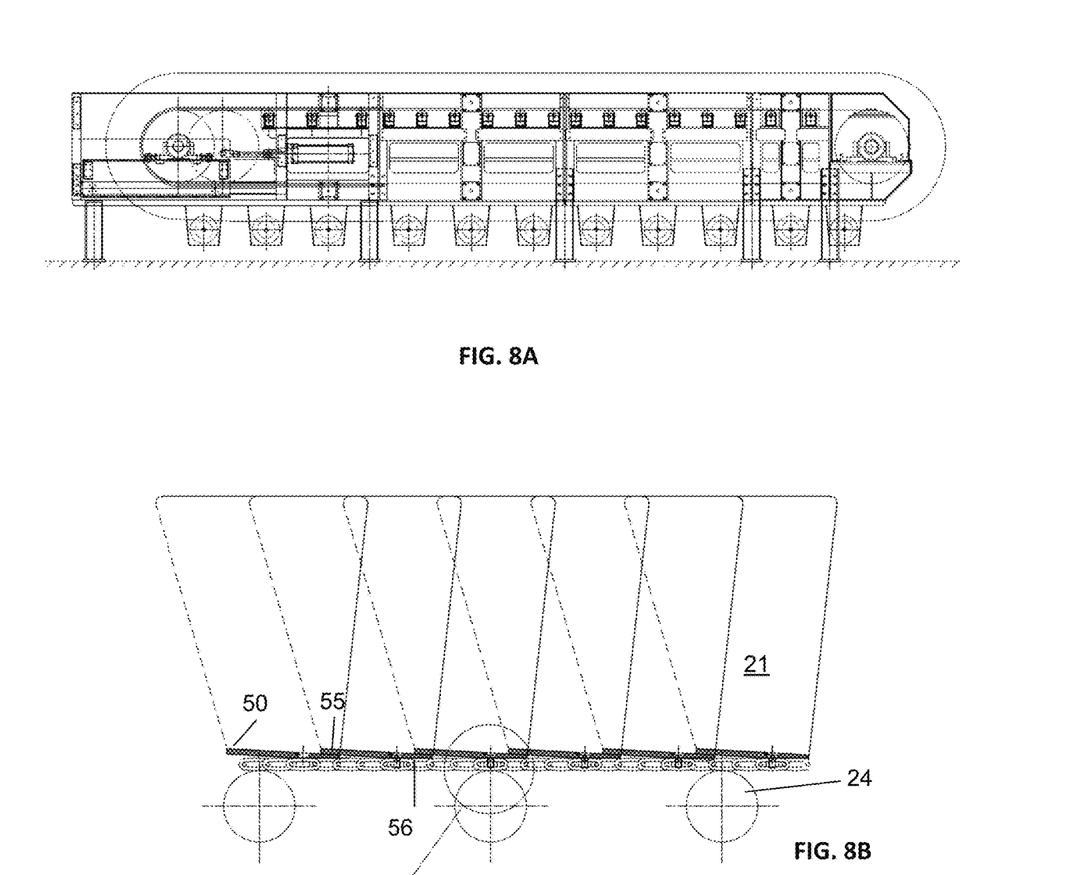
FIG. 8A relates to a preferred embodiment of a conveyor belt according to the invention, preferably a part of the device of FIG. 6 or 7, by showing a side view thereof.
FIG. 8B shows a longitudinal section view of the forward run of the conveyor belt of FIG. 8A.

The transport surface 11 is defined by a longitudinal sequence of transport plates 50, typically made of metal and partially superimposed one with respect to the other one at respective end longitudinal portions. In particular, by considering the advance direction V along the transport direction L, each plate 50 is superimposed on the plate preceding it (that is downstream with respect to the direction V) and placed under the plate following it (that is upstream with respect to the direction V).

More specifically, on each plate a first and a second longitudinal end portion, respectively 55 and 56, can be detected. At such portions 55 and 56 the plate 50, in the forward run 12 of conveyor belt 10, is respectively superimposed on an adjacent plate arranged upstream of the sequence with respect to the transport direction L and placed under an adjacent plate arranged downstream in such sequence.

Figure 8C:
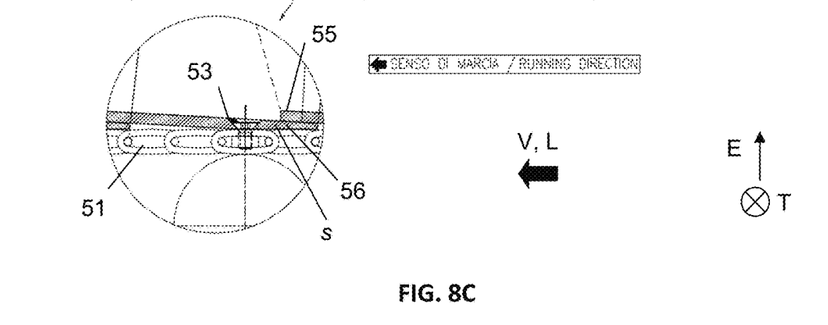
FIG. 8C shows an enlarged detail of FIG. 8B.
Figure 8D:
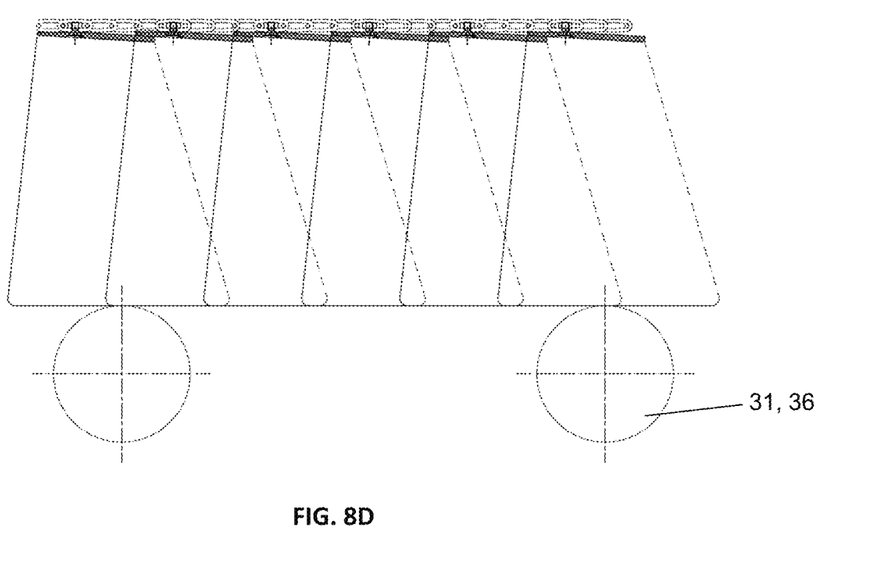
FIG. 8D shows a longitudinal section view of a backward run of the conveyor belt of FIG. 8A.

According the invention, each plate 50, at the second longitudinal portion 56 of placing under an adjacent plate, has a section (according to the plane defined by the directions E and L) with thickness s decreased with respect to a remaining portion of the plate itself. In this way, in the superimposition region the overall thickness of a step of the contact surface between conveyor belt 10 and transport rollers 24 results to be reduced.

Preferably, such decreased, or reduced, thickness is obtained by means of a tapered section profile, with thickness decreasing in the direction opposite to the advance one, that is decreasing towards the longitudinal end (upstream) of the plate 50.

The not reduced thickness of each plate 50 can be comprised in a range of about 4-10 mm. Said decreased thickness can be comprised in a range of about 2-6 mm.

The above-mentioned thickness decrease can be obtained, for example, by milling or by means of other processes such as moulding, hot forging or melting.

Embodiment variants can provide that the thickness decrease is obtained not on all plates but on alternated plates, and then in a selected number of plates both at the first and at the second portion 55 and 56. In particular, at the portion 55 the thickness decrease can implement an undercut, or recess or receipt, for the adjacent plate, however obtaining the decrease in height of the step in the contact surface between conveyor and supporting elements 24.

Each plate 50 bears the already mentioned side borders 21 with function of containing the material transported on the surface 11. Thanks to the superimposition of adjacent plates, even the respective side borders are partially superimposed in longitudinal direction. Such superimposition of borders increases the overall contact surface of the conveyor belt 10 with the revolving elements 31 or 36 of the supporting means 3, 3', by improving the overall mechanical stability of the support and, in general, of the device.

The plates 50 are fastened to a metallic net 51, shaped like a ring, by means of screws 53, rivets or equivalent means. In embodiment variants, the net-like structure can be replaced by a chain or by a different annular structure. Such connection between plates and annular structure is preferably obtained in a region of each plate distinct from the superimposition portions 55 and 56.

Similarly to the known art, the wire net 51 can act as organ for transmitting the motion, by connecting, as already mentioned, two drums with adequate diameter arranged at the longitudinal ends of the conveyor belt 10. As already said, one of such drums can be moved by means of electric motor connected to the shaft thereof, the other one can be idle and induced to rotate around its own axis thanks to the contact by friction of the metallic net 51 put in tension by a suitable tensioning system, the latter known on itself and thus not further described.

Thanks to the above-mentioned selective decrease in thickness of the plates, the net-like belt, or an annular structure equivalent thereto, substantially rests in planar way upon the plates themselves and then on supporting rollers 24. In this way, the traction force exerted by the connecting screws 53 does not deform the position of the net-like belt and it does not affect the linearity thereof. Therefore, the vibrations mentioned with reference to the known art are absent, or however strongly reduced.

Figures 9, 9A, 9B:
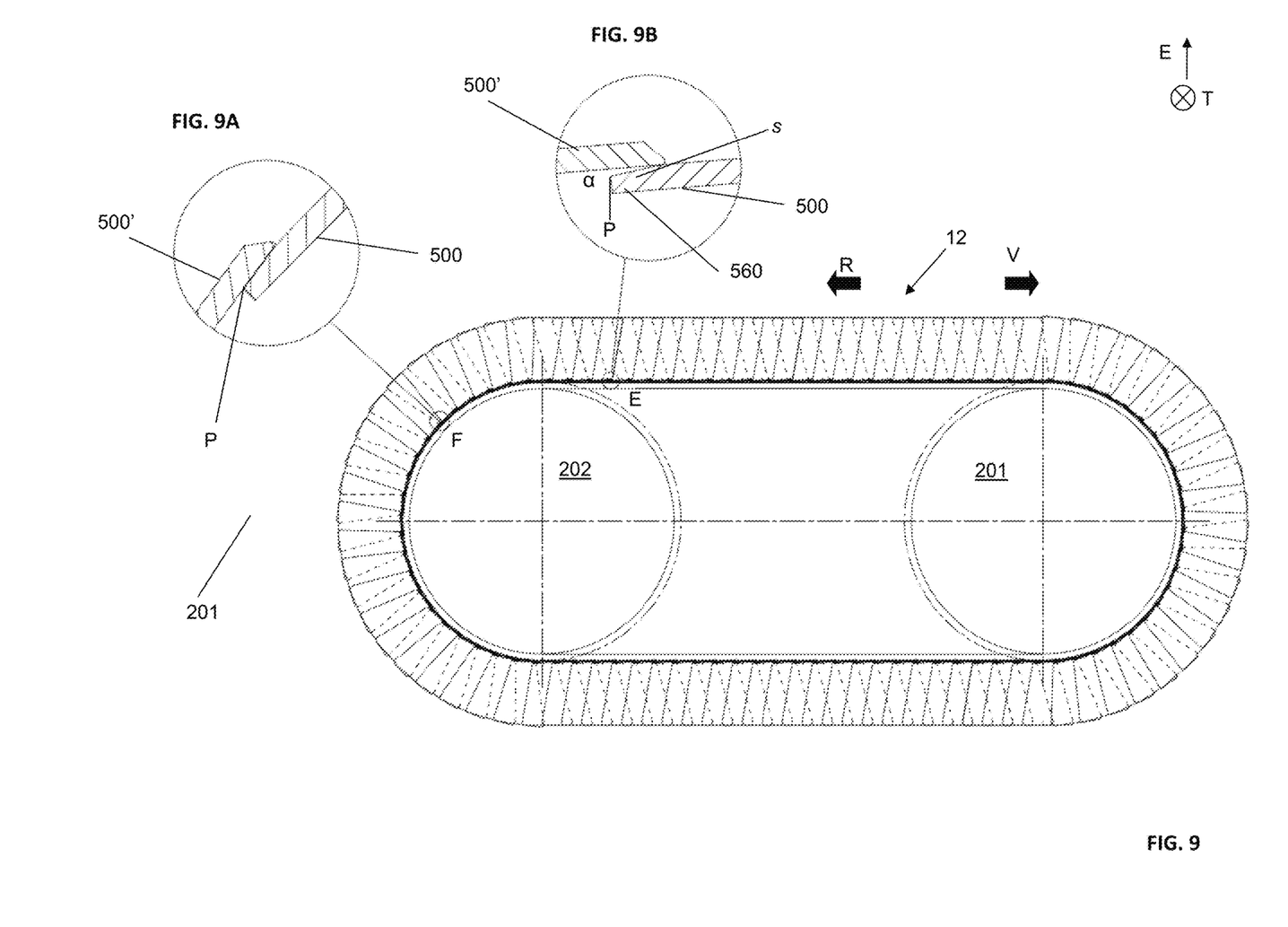
FIG. 9 relates to an additional preferred embodiment of a transport device according to the invention, by showing a side view thereof.
FIGS. 9A and 9B show each one a respective enlarged detail of FIG. 9.

FIGS. 9, 9A and 9B relate to an additional preferred embodiment of a structure of conveyor belt according the invention, which will be described mainly only in relation to the differences with respect to the previous embodiments. In particular, FIGS. 9A and 9B show an enlarged detail of the superimposition of the plates, herein designated each one with 500, substantially at the same points F and E already considered with reference to the known art (FIGS. 1E and 1F). Such figures highlight then the mutual positions of two subsequent plates both in the substantially rectilinear transport run 12, and during the winding on the drums, in the specific case on the idler drum 202.

According to the invention, each plate 500, at a terminal longitudinal portion 560 of placing under an adjacent plate (the latter designated with 500'), has a section (according to the plane defined by the directions E and L already mentioned above) with decreased thickness s with respect to a remaining portion of the plate itself.

Even in this case, such decreased, or reduced, thickness is obtained by means of a tapered section profile with decreasing thickness. In particular, the terminal portion 560 bears a chamfer, with taper tilting in direction L designated with a.

Even this thickness decrease can be obtained, for example, by milling or by means of other processes like moulding, hot forging or fusion.

The geometry of superimposing between the plates, and in particular the mutual position in the area of plate placed under the adjacent one, is so as to prevent the detach between such plates in both running directions during the rotation on the drum, as highlighted in FIG. 9A and better explained hereinafter.

Figure 10:
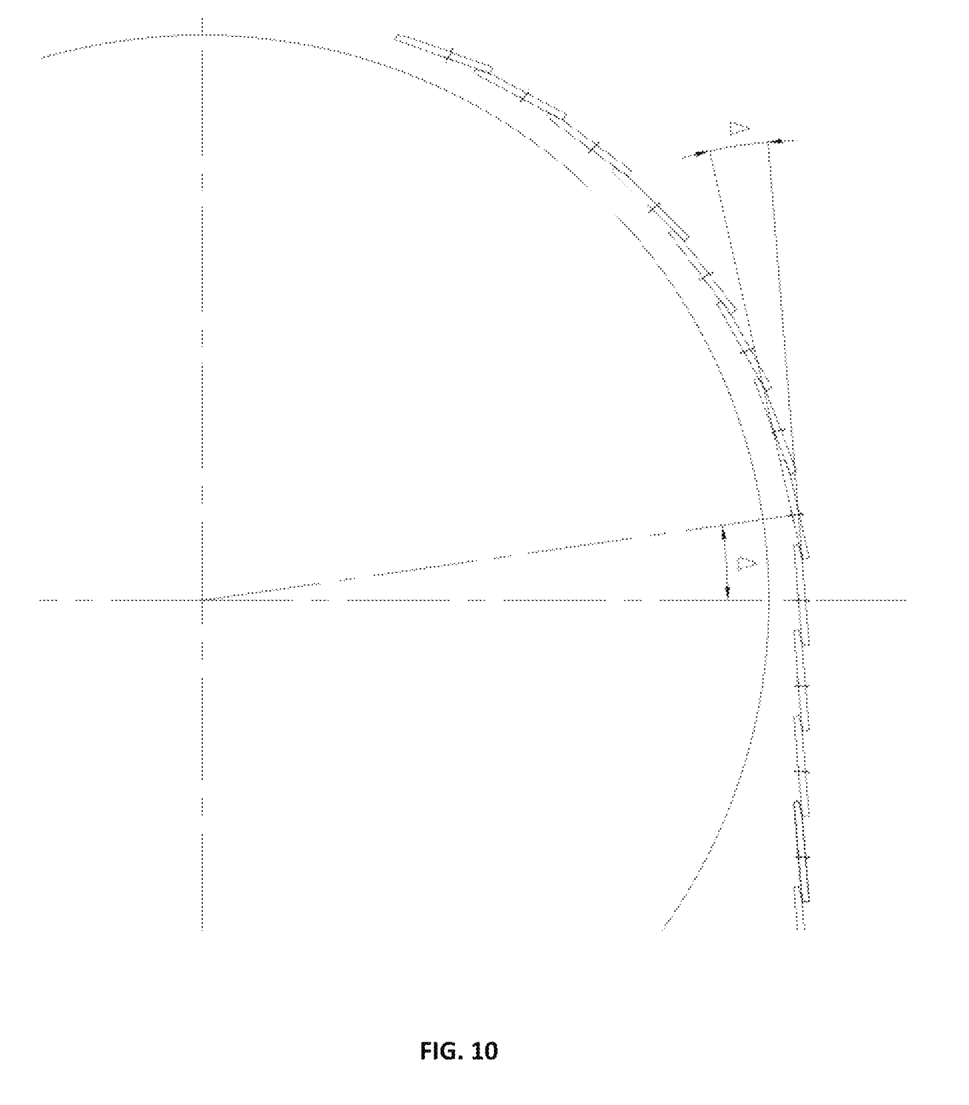
FIG. 10 shows a schematic geometrical representation of the rotation angle of plates of the transport device of FIG. 9 around a drum of the same device.

As already said, when the belt joins the plates on the traction an idler drums 201 and 202, each plate 500, 500' performs a rotation equal to an angle Δ around an ideal axis parallel to the transport cross surface in direction T and passing through the connecting point thereof to the metallic net or other supporting element. The angle Δ is schematically illustrated in FIG. 10. During the rotation the mutual position of each plate changes.

In the configuration of FIGS. 9, 9A and 9B the surface of the upper plate 500'— in the rotation thereof around the drum 202 with reversed running direction R—does not meet an obstacle consisting in the end cross edge P of the plate 500 placed thereunder. Similarly, in the nominal running direction V the end cross edge P of the placed-under plate 500, in the rotation thereof around the drum 201, does not meet an obstacle on the lower surface of the superimposed plate 500'.

As said, such absence of mechanical interference is obtained by providing a chamfer on the placed-under end 560 of each plate, with a chamfer angle α greater than or equal to the maximum rotation angle Δ covered by each plate on the drum.

Still in a preferred configuration, the length of the chamfer, or however of the portion with reduced thickness, in direction L performed on each plate has a length equal or substantially equal to the superimposition run of the plates. Preferably, the contact position of the superimposed plate coincides with the upper beginning, or leading line, of the chamfer of the placed-under plate.

In this way the placed-under plate portion wholly receives the end of the superimposed plate by making the profiles to match and by guaranteeing a continuous contact and with increased surface extension of the adjacent plates, both in the transport position and in the winding on the drum position.

The same advantage is obtained in case of conveyor belt arranged tilted, that is with not horizontal transport direction L.

Furthermore, such adhesion between the plates is obtained at the winding on both drums, independently from the running direction.

It will be appreciated that the invention can be applied even with types of belt conveyors having side prolongations, or appendixes, of the transport surface as those shown for example in FIGS. 2A and 2B and described with relation to the known art.

Based upon preferred embodiments, the belt of the invention is suitable to receive flow rates of material in the order of 2000 m³/h for cross widths of the conveyor of 2000 mm and height of the containment side borders of 500 mm, in particular with speeds of 0.5 m/s.

Furthermore, still based upon preferred embodiments, the invention can allow an increase in the belt speed up to even 5-8 times the above-mentioned traditional speed, thus with speeds in a range of about 0.5-0.8 m/s.

Moreover, still based upon preferred embodiments, the invention allows a reliable operation of the conveyor both in case of reversal running and in case of high tilting of transport.

The present invention has been sofar described with reference to preferred embodiments. It is to be meant that other embodiments belonging to the same inventive core may exist, as defined by the protective scope of the herebelow reported claims.

The invention claimed is:

1. A conveyor belt capable of the dry handling bulk material even at high temperature, such as DRI (Direct Reduced Iron) outgoing from reducing oven/reactor, which conveyor belt is supported on supporting rollers and is of closed-path type and comprising:

transport plates optionally made of metal, which transport plates define a transport surface for the bulk material in a forward run of the conveyor belt, which transport plates are arranged in sequence along a transport longitudinal direction, wherein each transport plate bears a first and a second longitudinal end portion that, in said forward run, is respectively superimposed on an adjacent transport plate arranged upstream of the sequence with respect to the transport longitudinal direction and placed under an adjacent transport plate arranged downstream in such sequence, or vice versa; and an annular structure for connecting said transport plates such annular structure being net-like shaped made of metal, which annular structure is arranged, in said forward run, below said transport plates, which annular structure acts as motion transmission organ and connects two drums arranged at longitudinal ends of the conveyor belt, wherein at least one of said transport plates has, at a lower surface of said first longitudinal portion superimposed to an adjacent plate or at an upper surface of said second longitudinal portion placed under an adjacent plate, a cross section with thickness decreased with respect to a remaining portion of the transport plate, in such a way that step-like profiles at the contact between the conveyor belt and the supporting rollers are eliminated or reduced and that mechanical interference between said lower surface and an end edge of the adjacent transport plate during rotation on the two drums is eliminated, wherein said connection between each transport plate and said annular structure is obtained in a plate region distinct from said first and second longitudinal portion of superimposing/placing under adjacent plates, wherein each one of said transport plates, in said first or second longitudinal portion, has a planar development along said transport longitudinal direction with a tapered section, or chamfer, with thickness decreasing towards the end portion of the transport plate, wherein said chamfer has a chamfer angle greater than or equal to a maximum rotation angle of each transport plate around a drum, and wherein said chamfer has a longitudinal length equal to a superimposing/placing-under run of the transport plates.

2. The conveyor belt of claim 1, wherein each one of said transport plates has said second longitudinal portion placed under an adjacent transport plate, such adjacent transport plate arranged upstream of the sequence with respect to the longitudinal transport direction, and wherein said section with decreased thickness with respect to a remaining portion of the transport plate is obtained at such second longitudinal portion.

3. The conveyor belt of claim 1, wherein said decreased thickness is comprised in a range of about 2-6 mm.

4. The conveyor belt of claim 1, configured to be arranged with said longitudinal transport direction tilted with respect to the horizontal.

\* \* \* \* \*